US012784455B2

(12) United States Patent
Alanazi et al.

(10) Patent No.: US 12,784,455 B2
(45) Date of Patent: Nov. 3, 2026

(54) SCAFFOLDING SAFETY COMPLIANCE DETECTION USING COMPUTER VISION

(71) Applicant: Saudi Arabian Oil Company, Dhahran (SA)

(72) Inventors: Abdullah M. Alanazi, Al Khobar (SA); Naif R. Almutairi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 581 days.

(21) Appl. No.: 18/073,353

(22) Filed: Dec. 1, 2022

(65) Prior Publication Data

US 2024/0185608 A1 Jun. 6, 2024

(51) Int. Cl.
*G06V 20/52* (2022.01)
*G06T 7/70* (2017.01)
(Continued)

(52) U.S. Cl.
CPC ................ *G06V 20/52* (2022.01); *G06T 7/70* (2017.01); *G06V 10/955* (2022.01); *G06V 20/41* (2022.01);
(Continued)

(58) Field of Classification Search
CPC ........ G06V 20/52; G06V 40/10; G06V 20/41; G06V 10/955; G06T 7/70;
(Continued)

(56) References Cited

U.S. PATENT DOCUMENTS 9,143,843 B2 9/2015 De Luca et al.
9,695,981 B2 7/2017 Au et al.
(Continued)

FOREIGN PATENT DOCUMENTS

CN 110864661 A 3/2022
CN 114111905 A 3/2022
(Continued)

OTHER PUBLICATIONS

Khan et al. "Utilizing safety rule correlation for mobile scaffolds monitoring leveraging deep convolution neural networks", Computer Industry129, 2021, Elsevier. (Year: 2021).*
(Continued)

*Primary Examiner* — Shaghayegh Azima
(74) *Attorney, Agent, or Firm* — Fish & Richardson P.C.

(57) ABSTRACT

Systems, methods, and computer-readable storage media can include receiving, by a hardware processor, one or more images of a worksite that includes a scaffold; identifying, by the hardware processor operating computer vision processing, a presence of a person on the scaffold; identifying, by the hardware processor operating image analysis processing, one or more items of personal protective equipment in the one or more images; determining, by the hardware processor operating image analysis processing, a position of the one or more items of personal protective equipment relative to the person in the one or more images; and verifying, by the hardware processor using safety standards compliance information, that the person is using the personal protective equipment in compliance with personal protective equipment standards based on the position of the one or more identified items of personal protective equipment.

15 Claims, 7 Drawing Sheets

(51) Int. Cl.
*G06V 10/94* (2022.01)
*G06V 20/40* (2022.01)
*G06V 40/10* (2022.01)

(52) U.S. Cl.
CPC .... *G06V 40/10* (2022.01); *G06T 2207/10016* (2013.01); *G06T 2207/30108* (2013.01); *G06T 2207/30196* (2013.01); *G06T 2207/30232* (2013.01)

(58) Field of Classification Search
CPC . G06T 2207/10016; G06T 2207/30108; G06T 2207/30196; G06T 2207/30232
See application file for complete search history.

(56) References Cited

U.S. PATENT DOCUMENTS

| | | | | |
|---|---|---|---|---|
| 2013/0282609 | A1* | 10/2013 | Au | F16P 3/142<br>705/325 |
| 2014/0307076 | A1* | 10/2014 | Deutsch | G06V 10/56<br>348/77 |
| 2023/0410526 | A1* | 12/2023 | Sonawane | G06V 20/52 |
| 2024/0331385 | A1* | 10/2024 | Itsumi | G06V 20/44 |

FOREIGN PATENT DOCUMENTS

| | | | | | |
|---|---|---|---|---|---|
| CN | 216014299 | U | * | 3/2022 | |
| CN | 114708716 | A | | 7/2022 | |
| CN | 115376072 | A | * | 11/2022 | G06T 7/62 |
| CN | 114049573 | B | * | 7/2024 | G06F 18/241 |
| EP | 4350639 | A1 | * | 4/2024 | G06V 10/82 |
| JP | 2019031811 | A | * | 2/2019 | |
| JP | 7461224 | B2 | * | 4/2024 | |

OTHER PUBLICATIONS

Sundt construction, "project safety management plan", Jul. 2021. https://www.sundt.com/wp-content/uploads/2021/07/Project-Safety-Management-Plan_July2021.pdf. (Year: 2021).*
SAIP Examination Report in Saudi Arabian Appln. No. 123450939, dated Mar. 17, 2025, 12 pages (with English translation).

* cited by examiner

400

*FIG. 5*
HELMET OFF!
SCAFFOLD ACTIVE
2021-03-16 10:19:20

500

600

SCAFFOLDING SAFETY COMPLIANCE DETECTION USING COMPUTER VISION

FIELD

This disclosure pertains to scaffolding safety compliance detection using computer vision.

BACKGROUND

Scaffolding is a temporary structure used to support a work team and materials to aid in the construction, maintenance, and repair of buildings, bridges, and all other manmade structures. Scaffolding is common in oil and gas facilities, including offshore and onshore rigs, refineries, bulk plants, and petrochemical sites, to allow easy access to industrial worksites or construction sites.

SUMMARY

The present disclosure describes techniques that can be used for determining safety compliance for workings on scaffolding using computer vision techniques.

In some implementations, a computer-implemented method includes the following.

Aspects of the embodiments are directed to a computer-implemented method that includes receiving, by a hardware processor, one or more images of a worksite that includes a scaffold; identifying, by the hardware processor operating computer vision processing, a presence of a person on the scaffold; identifying, by the hardware processor operating image analysis processing, one or more items of personal protective equipment in the one or more images; determining, by the hardware processor operating image analysis processing, a position of the one or more items of personal protective equipment relative to the person in the one or more images; and verifying, by the hardware processor using safety standards compliance information, that the person is using the personal protective equipment in compliance with personal protective equipment standards based on the position of the one or more identified items of personal protective equipment.

Aspects of the embodiments are directed to a non-transitory, computer-readable storage medium storing instructions that, when executed by a hardware processor, perform operations that include receiving one or more images of a worksite that includes a scaffold; identifying, by computer vision processing, a presence of a person on the scaffold; identifying, by image analysis processing, one or more items of personal protective equipment in the one or more images; determining, by image analysis processing, a position of the one or more items of personal protective equipment relative to the person in the one or more images; and verifying, using safety standards compliance information, that the person is using the personal protective equipment in compliance with personal protective equipment standards based on the position of the one or more identified items of personal protective equipment.

Aspects of the embodiments are directed to a system that includes an image capture device to capture images of a worksite; a hardware processor to execute instructions; and a non-transitory, computer-readable storage medium storing safety standards compliance information and storing instructions, that when executed by the hardware processor, perform operations. The operations can include receiving, by a hardware processor, one or more images of a worksite that includes a scaffold; identifying, by the hardware processor operating computer vision processing, a presence of a person on the scaffold; identifying, by the hardware processor operating image analysis processing, one or more items of personal protective equipment in the one or more images; determining, by the hardware processor operating image analysis processing, a position of the one or more items of personal protective equipment relative to the person in the one or more images; and verifying, by the hardware processor using safety standards compliance information, that the person is using the personal protective equipment in compliance with personal protective equipment standards based on the position of the one or more identified items of personal protective equipment.

Some embodiments include identifying, by the hardware processor operating computer vision processing, a presence of safety notification signage on the scaffolding; determining, by the hardware processor operating image analysis processing, a type of scaffold safety tag on the scaffold in the one or more images; verifying, by the hardware processor using safety standards compliance information, that the person on the scaffold is in compliance with safety standard based, at least in part, on the type of scaffold safety tag determined from the image analysis processing.

Some embodiments include determining, by the hardware processor operating image analysis processing, a height of the scaffold from the one or more images; verifying, by the hardware processor using safety standards compliance information, that the person is using the personal protective equipment in compliance with personal protective equipment standards based on the height of the scaffold.

In some embodiments, determining, by the hardware processor operating image analysis processing, a position of the one or more items of personal protective equipment relative to the person in the one or more images includes identifying, from the one or more images, a uniquely identifying characteristic of the personal protective equipment, the uniquely identifying characteristic comprising one or more of coded marks, color patterns, bar codes, emitted light frequency, or absorbed light frequency.

In some embodiments, the hardware processor performs image analysis on the one or more images in response to determining that a person is on the scaffold.

In some embodiments, the one or more images comprises one or both of a set of still images and a set of video frames.

In some embodiments, the operations further include identifying, by computer vision processing, a presence of safety notification signage on the scaffolding; determining, by image analysis processing, a type of scaffold safety tag on the scaffold in the one or more images; verifying, using safety standards compliance information, that the person on the scaffold is in compliance with safety standard based, at least in part, on the type of scaffold safety tag determined from image analysis processing.

In some embodiments, the operations further include determining, by image analysis processing, a height of the scaffold from the one or more images; verifying, using safety standards compliance information, that the person is using the personal protective equipment in compliance with personal protective equipment standards based on the height of the scaffold.

In some embodiments, determining, by the hardware processor operating image analysis processing, a position of the one or more items of personal protective equipment relative to the person in the one or more images includes identifying, from the one or more images, a uniquely identifying characteristic of the personal protective equipment, the uniquely identifying characteristic comprising one or more of coded marks, color patterns, bar codes, emitted light frequency, or absorbed light frequency.

In some embodiments, the hardware processor performs image analysis on the one or more images in response to determining that a person is on the scaffold.

In some embodiments, the one or more images comprises one or both of a set of still images and a set of video frames.

In some embodiments, the operations further include identifying, by the hardware processor operating computer vision processing, a presence of safety notification signage on the scaffolding; determining, by the hardware processor operating image analysis processing, a type of scaffold safety tag on the scaffold in the one or more images; verifying, by the hardware processor using safety standards compliance information, that the person on the scaffold is in compliance with safety standard based, at least in part, on the type of scaffold safety tag determined from the image analysis processing.

In some embodiments, the operations further include determining, by the hardware processor operating image analysis processing, a height of the scaffold from the one or more images; verifying, by the hardware processor using safety standards compliance information, that the person is using the personal protective equipment in compliance with personal protective equipment standards based on the height of the scaffold.

In some embodiments, determining, by the hardware processor operating image analysis processing, a position of the one or more items of personal protective equipment relative to the person in the one or more images includes identifying, from the one or more images, a uniquely identifying characteristic of the personal protective equipment, the uniquely identifying characteristic comprising one or more of coded marks, color patterns, bar codes, emitted light frequency, or absorbed light frequency.

In some embodiments, the hardware processor performs image analysis on the one or more images in response to determining that a person is on the scaffold.

In some embodiments, the one or more images comprises one or both of a set of still images and a set of video frames.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. For example, aspects of this disclosure can facilitate compliance with safety standards for use of scaffolds in worksites, which can lead to improvements in worker/workplace safety and fall prevention. Non-compliance can be identified quickly and automatically, through the use of computer vision techniques, thereby increasing safety compliance response times and mitigates human error from the analysis.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

Figure 1:
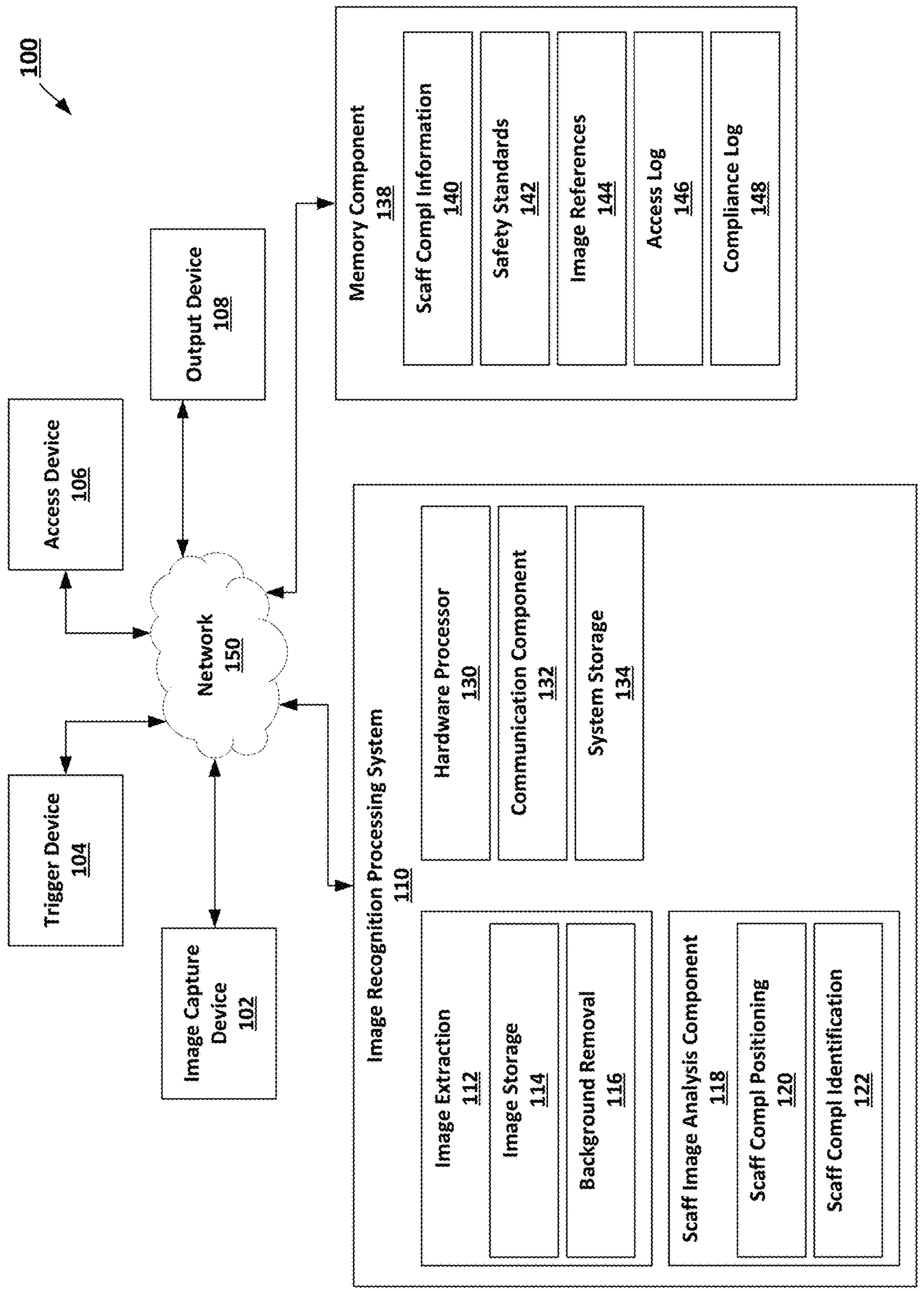
FIG. 1 is a schematic diagram of an example embodiment of scaffolding compliance computer vision system in accordance with embodiments of the present disclosure.

The following detailed description describes techniques for determining safety compliance of working on scaffolding using computer vision techniques. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Working on scaffolding can be injurious due to risks associated with falling from heights and/or being struck by falling objects. Injuries related to accidents from work related to scaffolding can include lacerations, fractures, internal organ damage, brain trauma, and other types of injuries. Beyond the catastrophic damage a worker can experience, workplace safety compliance is mandatory, and failure to comply with workplace safety standards can result in penalties to companies and setbacks in productivity. Such safety standards can include rules and guidance set forth by standards setting organizations, such as the Occupational Safety and Health Administration (OSHA), the International Labour Organization (ILO), and other safety standards bodies.

Safety standards compliance with respect to scaffolding can include how workers themselves use safety equipment property to protect against harm. But safety compliance can also include the proper construction and maintenance of the scaffolding itself, as well as the proper use of safety notifications and other modes of safety standard compliance.

This disclosure relates to a customized computer vision model for smart scaffolding compliance detection that can be mounted as a fixed or mobile solution. The computer vision model can receive data from one or more cameras on-site, and can work over any low latency network to inspect and detect unsafe behavior and actions to ensure safety compliance for scaffolding activities. The computer vision model described herein can improve health, safety, and environment monitoring on construction sites. The computer vision techniques described herein include scaffolding compliance detection to detect at least the following:

Unused scaffolding for a long time without movement or work activities;

Scaffolding with expired certificates;

Wearing a harness and proper anchoring;

Corroded scaffold bars;

Estimate the height of the scaffolding; and

Tag recognition and expired certificates detection.

In some implementations, the computer vision techniques can be used first to create an image of a scene to visually map scaffolding within the scene. The computer vision techniques can then determine whether the scaffolding includes certain required labels or other safety notices. The computer vision techniques can be used to identify a human operator that are on the scaffolding. The computer vision techniques can then determine whether the human operator The computer vision models described herein can be used to detect compliance and use of personal protective equipment (PPE) and not just the existence of PPE at worksites. The computer vision models of this disclosure can ensure that the PPE is worn at all times when a person is on the scaffold. As a result, systems and techniques are provided herein for verifying that a person has and is wearing the proper PPE and other safety equipment before authorizing access to the work area and during work on the scaffold. The systems and methods can also determine whether the suitable type of PPE is being worn.

FIG. 1 is a schematic diagram of an example embodiment of scaffolding compliance computer vision system 100 in accordance with embodiments of the present disclosure. The scaffolding compliance computer vision system 100 includes an image capture device 102, a trigger device 104, an access device 106, an image recognition processing system 110, an output device 108, and a memory 138 all coupled by a network 150. Image recognition processing system 110 can include one or more hardware processors 130 that execute instructions for image recognition and image analysis to verify safety standards compliance for scaffolding in a worksite.

The scaffolding compliance computer vision system 100 is configured to detect compliance with safety standards by people working on a scaffold. Various industries may utilize one or more kinds of scaffold, including oil & gas sites, construction sites, or other industrial worksites. The scaffold safety standards may vary from one industry to another, and the scaffold safety standards can vary within an industry depending on the particular worksite, scaffold type, scaffold structure, etc. For example, a scaffold used for a particular type of industrial or construction project can have different safety standards than a different type. Different height scaffolds can have different requirements. The age of the scaffold or materials used can create different safety requirements. Other examples are within the scope of this disclosure. An example of safety standards for operating a scaffold can include the use of harnesses, helmet requirements, maximum number of people on the scaffold, type of work that is within the structural safety limits of the scaffold, compliance with scaffold safety inspection tags, etc.

In an embodiment, the scaffolding compliance computer vision system 100 may be used to verify compliance with the scaffold safety standards that includes the use of one or more types of personal protective equipment (PPE) including, but not limited to, glasses, goggles, face masks, respirators, hard hats, wrist bands, gloves, skirts, gowns, aprons, shoes, boots, safety harnesses, safety suits, and any combinations thereof. Each kind of PPE may include specific PPE types. For example, glasses may include specific types of glasses including shatter resistant glasses, light filtering glasses, laser safety glasses, etc. Various sub-groupings of the types are also possible. For example, specific glasses or goggles may be used for particular laser frequency ranges in a laser emissive area. Similarly, materials used to form gloves, suits, etc. may each have different chemically resistant properties, making not only the specific type of PPE important, but in some embodiments, also the specific sub-type of the PPE. A hierarchy of PPE kind, type, and sub-types may then be considered for any particular usage.

The image capture device 110 generally includes an image capture device 102 for capturing one or more images that are represented by image data and/or can be converted into image data. In an embodiment, the image capture device 102 comprises an electronic device (e.g., a camera or other image capturing device) used to capture an image of an individual triggering the trigger device 104. In one embodiment, suitable image capture devices 102 can include, but are not limited to, analog video cameras, digital video cameras, color and/or monochrome cameras, closed-circuit television (CCTV) cameras, charged-coupled device (CCD) sensors, complementary metal oxide semiconductor (CMOS) sensors, analog and/or digital cameras, pan-tilt-zoom cameras (PTZ), infra-red imaging devices, any other device capable of capturing an image and/or image data, and any combination thereof. The image capture device 102 generally includes the circuitry, components, and connections for transmitting the image to one or more other components of the scaffolding compliance computer vision system 100, such as the image recognition processing system 110.

The trigger device 104 is configured to initiate the image recognition process through the generation of a trigger signal. In an embodiment, the trigger device 104 may take the form of an entry way device to a work area such as a badge reader (e.g., a wireless badge reader), keypad, camera image, RF ID scanner, door handle, etc. that can indicate that a person has entered a scaffold. In this embodiment, a trigger signal may be generated by activation of the trigger device, thereby initiating the image recognition process at the entry to the scaffold at the worksite. In another embodiment, the trigger device 104 may take the form of an initiation device for a device (e.g., a piece of equipment in a worksite). For example, the trigger device 104 may include a power switch, authorization keypad, positioning handle, or the like on a device. In this embodiment, a trigger signal may be generated by the activation of the trigger device at the device. This embodiment may be useful in verifying proper use of the PPE for the particular device at the time the device is activated. In another embodiment, the trigger device may take the form of the image capture device 102 and a computer vision routine for change detection and person detection. In this embodiment, a trigger signal may be generated when a person is within the field of view of the image capture device 102.

The trigger device 104 can comprise any of a number of devices configured to provide the location of a person to the image recognition processing system 110. A variety of devices can be used to obtain the location of a person within a work area. In an embodiment, the trigger device 104 may include one of a group of near field communication (NFC) devices including, but not limited to, infra-red devices, ultra-sonic devices, optical devices, RFID devices, wireless devices, Bluetooth based devices, Wi-Fi based communication devices, and any other communication links that do not involve direct physical contact. The trigger device 104 can be associated with a person (e.g., as part of an employee badge), an item of PPE possessed by a person, and/or a mobile device carried by the person. A plurality of readers configured to communicate with a particular device can be placed throughout the work area.

The access device 106 may take various forms and is generally configure to provide access to a work area and/or device when the image recognition process determines that the PPE is being properly worn and/or matches the type of PPE approved for the specific work area and/or device. In an embodiment, the access device 106 may comprise a door lock, opening mechanism, device interlock, device lock-out feature, or the like. Upon a determination that the PPE for a person satisfies the criteria for a work area and/or piece of equipment, the access device may receive an activation signal and thereby grant access to a work area and/or allow for the activation of a piece of equipment.

In an embodiment, the image recognition process system 110 includes an image extraction component 112, image analysis component 118, scaffolding compliance analysis component 124, one or more hardware processors 130, and a communications component 132. The image recognition process system 110 may include and use sets of instructions that may be implemented on a computer using at least one hardware processor and at least one non-transitory computer readable medium acting as a system storage 134. A image recognition process system 110 and its associated equipment and operations are described in more detail herein.

The image extraction component 112 includes an image storage component 114 and a background removal component 116. The image storage component 114 can include a digital storage device for storing images received from image capture device 102 that are to be analyzed. Image storage component 114 can be a temporary storage device that is cleared as images are processed to make room for new images. For example, images can be streamed into the image recognition processing system 110 for continual processing after a triggering event is detected. Image storage 114 may be configured to store image data during the image recognition process. In an embodiment, the image storage 114 may include a circular storage buffer configured to maintain a buffer of images from the image capture device. Upon activation of the trigger device 104, the images obtained prior to the activation of the trigger device can be retrieved and used as the background reference data in the image recognition process. The circular storage buffer generally comprises a memory structure in which the image data may be stored in sequence in the image storage component 114 until the end of the available memory is reached, and then storing may begin again at the start of the image storage component 114, overwriting the oldest stored image data. In other embodiments, other memory structures may be employed.

In an embodiment, the image recognition processing system 140 may comprise a background removal component 143. In this embodiment, the image extraction component 141 may rely on a reference or background image for comparison with a captured image or images and perform image subtraction to identify those pixels that have changed between the two images. The remaining image data may form the ROI, which can then be analyzed to identify a particular object or objects such as the PPE item or items and/or one or more portions of a person. The background removal component 116 can be used by the image extraction component 112 to extract reference or background imagery. Reference or background image can be used for comparison with a captured image or images and perform image subtraction to identify those pixels that have changed between the two images. The remaining image data may form the region of interest (ROI), which can then be analyzed to identify a particular object or objects such as the scaffold, people on the scaffold, and/or PPE item or items. The background removal component 116 can also be part of the image analysis component 118.

The image extraction component 112 can be set up to take image data and extract a section of it that corresponds to a person and/or one or more pieces of scaffolding for compliance analysis. The image extraction component 112 may include a set of instructions for analyzing image data from the image capture device 102 to identify a specific object or objects, such as the scaffolding, persons, PPE, tags, etc., and/or one or more portions of a human, such as the person's shoulders and head, in one embodiment.

Figure 3:
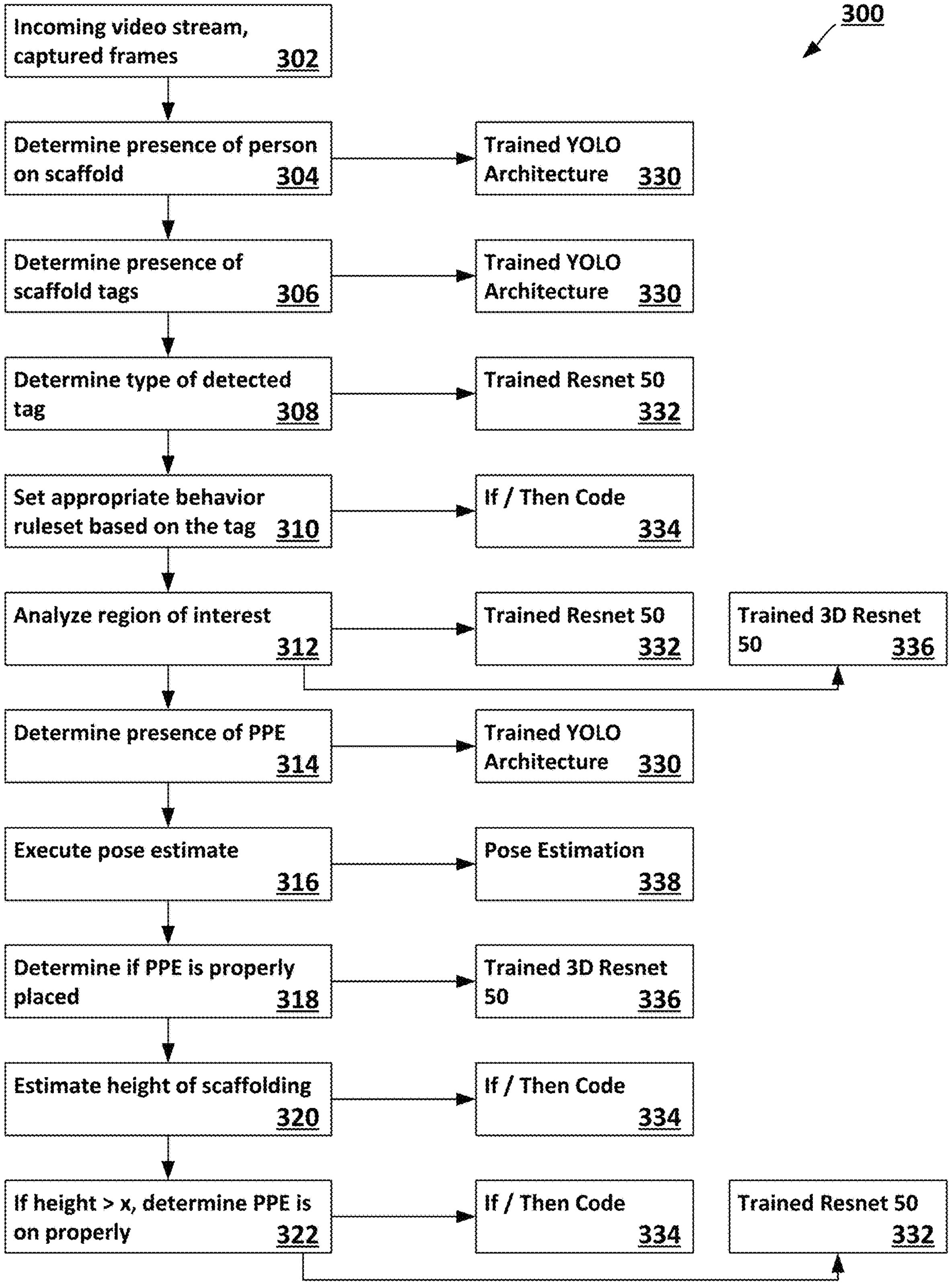
FIG. 3 is an example process flow for determining scaffold safety compliance using trained algorithms in accordance with embodiments of the present disclosure.

As shown in FIG. 3, Yolo-based Computer Vision architecture, for example, can be used to identify the edges of objects in a picture. A Region of Interest (ROI) is formed by a group of intersecting edges, and the shape of the ROI can be used to detect if one or more Scaffolding Compliance Analysis items are present, as well as their approximate placement on the person. Information coming from a Pose Estimation Algorithm allows the system to determine the body posture of the people at the site. Face detection algorithms, for example, can detect a face or a person based on the classification of extracted data.

The image extraction component 112 may be configured to receive the image data and isolate portions of the image germane to the scaffold safety standards compliance analysis performed by the image recognition processing system 110. In an embodiment, the image extraction component 112 may include a set of instructions configured to analyze the image data from the image capture device 102 to identify a particular object or objects such as the scaffold, a person, safety tags on the scaffold, and/or PPE item or items and/or one or more portions of a person such as the person's shoulders and head. For example, edges of objects in the image may be identified by detecting significant changes in contrast levels from one set of pixels to an adjacent set of pixels. A group of intersecting edges may form a Region of Interest (ROI) and the shape of the resulting ROI may be analyzed to determine if one or more PPE items are present and their approximate location on the person. Another example may detect a face or a person based on classification on the extracted features, such as Harr features.

In embodiments, the image extraction component 112 compares a captured image or images to a reference or background image and uses image subtraction to identify pixels that have changed between the two images. The ROI can then be used to identify a specific object or group of objects, such as the scaffolding compliance item or items and/or one or more pieces of a human, using the remaining image data.

The scaffolding image analysis component 118 may be configured to analyze the image and/or an extracted portion of the image to identify aspects of the scaffold, such as the height, construction, materials, age, etc., the number of people on the scaffold, proper position/placement of the PPE and/or the use of the proper kind/type of PPE by the person. In an embodiment, the scaffolding image analysis component 118 may comprise a scaffold safety compliance positioning component 120 and/or a scaffold safety compliance identification component 122. The scaffold safety compliance positioning component 120 may be configured to analyze image data and identify the positioning of any PPE present relative to the body of the person. For example, the scaffold safety compliance positioning component 120 may be configured to identify the positioning of any helmet or hardhat relative to the head of a person, and specifically identify if the helmet/hardhat is covering the head of the person in an image of the person's body (as opposed to being in their hands or slung around their neck). The scaffold safety compliance positioning component 120 may also detect and signal the absence of PPE. The scaffold safety compliance identification component 122 may be configured to analyze the image data and determine the kind of PPE being worn. The PPE identification component 146 may be further configured to determine the type of PPE being worn, and in an embodiment, may further identify any number of sub-types of the PPE following the hierarchy of kind/types available for the specific PPE. The scaffold safety compliance identification component 122 can also determine the presence of safety tags and other notifications that are present in the image of the scaffold. The tags can be used in indicate the level of protection required to comply with safety standards or whether the scaffold is permitted for use at all.

The scaffolding image analysis component 118 can be set up to analyze the image and/or an extracted piece of the image in order to determine the proper position/placement of the PPE and/or the person's use of the correct kind/type of PPE on the scaffold to be in compliance with scaffold safety standards. A scaffolding compliance placement component 120 and/or a scaffolding compliance identification component 122 may be included in the image analysis component in one embodiment. The scaffolding image analysis component 118 can include a scaffolding compliance position component 120 to analyze image data and determine the position of any PPE equipment that is present on the person's body.

The lack of a scaffolding safety standards compliance may be detected and signaled by the scaffolding compliance position component 120. The scaffolding compliance identification component 122 can be set up to evaluate image data and figure out what kind of PPE is being worn. The scaffolding compliance identification component 122 may also be designed to determine the type of PPE being worn, and in one embodiment, to identify any number of sub-types of the PPE in accordance with the hierarchy of kinds/types accessible for the specific Scaffolding Compliance Analysis.

The scaffolding image recognition processing system 110 may be used to verify compliance with Scaffolding Compliance Analysis standards for one or more types of Scaffolding Compliance Analysis, such as glasses, goggles, earplugs, earmuffs, face masks, respirators, hairnets, hard hats, anchors, wrist bands, gloves, skirts, gowns, aprons, shoes, boots, safety harnesses, safety suits, chemical suits, and any combinations thereof, in one embodiment. Specific Scaffolding Compliance Analysis kinds may be included in each category of Scaffolding Compliance Analysis. Specific types of glasses, such as shatter-resistant glasses, light-filtering glasses, laser safety glasses, and so on, may be included in the category of glasses. It's also possible to divide the types into sub-groups. For any given user, a hierarchy of Scaffolding Compliance Analysis kind, type, and sub-types can then be explored. The image recognition system [440] described herein can be utilized to detect not only the type of Scaffolding Compliance Analysis but also the exact kind of Scaffolding Compliance Analysis, as well as one or more sub-types of Scaffolding Compliance Analysis in some instances. While the image recognition system's description may mention goggles as an example of Scaffolding Compliance Analysis, it is expressly acknowledged that any other Scaffolding Compliance Analysis type can be employed with the image recognition system described here.

To detect one or more elements of the Scaffolding Compliance Analysis and/or a person within the photos, various image recognition algorithms may be used in one or more portions of the image recognition process system [143]. The background modeling/removal approach, Canny imaging, Harris corner imaging, Shen-Castan edge detection, grey-level segmentation, skeletonization, pose estimation, Object Localization, and Object Classification, among others, are suitable algorithms. Any of the algorithms can be used to process image data in a way that detects visual aspects of Scaffolding Compliance Analysis and/or people (e.g., eyes, head, arms, hands, and/or other body parts). Various classification techniques can be used to identify if one or more features are present in the photos using the original image, any detected features, and/or any extracted section of the image. For example, depending on multiple classifiers, a vector space classifier model and/or an adaptive learning algorithm (e.g., an AdaBoost algorithm) may be used to detect one or more features of a person and/or an item of Scaffolding Compliance Analysis. The classification algorithms might be based on picture attributes, detected features, and/or extracted portions such as one or more edges, lines, Haar-like features, Resnet 50 generated features, local binary pattern, Histogram Orientation Gradient (HOG), Gabor filtered features, Resnet 50 based features and so on. The overall procedure can then be designed to identify one or more characteristics of the individual and/or one or more pieces of Scaffolding Compliance Analysis.

Scaffolding compliance computer vision system 100 has a memory component 138 that stores information, including scaffold compliance information 140, safety standards 142, image references 144, access log 146, and compliance log 148. Memory component 138 can include a storage device, such as a hard drive, server, cloud storage system, or other type of digital storage.

The memory component 138 can also include safety standards 142. Safety standards 142 may include information related to the PPE standards for a certain area and/or piece of equipment. The PPE standards may be used as a comparison against the PPE determined to be present by the image recognition processing system 110 during the analysis process. Similarly, the image references 144 may comprise information related to PPE references and/or back ground references for use with the image analysis process. These image references 144, which may be in form of images, their extracted features or their statistical models, may be used for developing the image recognition system and/or for comparison with the PPE determined to be present by the image recognition processing system 110.

The scaffold compliance information 140 can include information pertaining to descriptions of the numerous items of scaffolding compliance features associated with a work location, scaffold structure, and/or pieces of protective equipment may be included in the scaffolding compliance analysis. The descriptions could, for example, incorporate visual pixel patterns connected with the requisite PPE components (e.g., harness position, helmet on or off, scaffold tag types, etc.). The hierarchy descriptions for the work area and/or piece of equipment may comprise the kinds of scaffolding compliance information, the types of PPE associated with each kind of scaffolding compliance workflow, and optionally any number of sub-types and levels of sub-types associated with the procedure.

Scaffolding compliance information 140 may also include descriptions of various coded marking patterns used to identify the types and/or sub-types of PPE in addition to equipment and behavior descriptions. To identify specific types of compliance, a variety of coded marks can be employed. The coded marks can be set up to identify the scaffolding compliance analysis within the picture data and/or a piece of the image that has been removed. Color code patterns, color symbol patterns, an asymmetrical pattern, a two-dimensional bar code, a short code, a SEMACODE, a color light pattern, and the like are examples of suitable coded marks. The available surface area for placing the coded marking on the scaffolding compliance analysis, the type of material used to form the PPE, the resolution and expected distance from the camera to the coded marking, and the lighting conditions in the vicinity of the camera may all influence the coded marking chosen for use with a particular Scaffolding Compliance Analysis. The coded markings may be made of a variety of materials, such as coatings that absorb and/or reflect different wavelengths of light, such as infrared (IR) reflecting and/or absorptive coatings, ultraviolet (UV) reflective and/or absorptive coatings, and the like. The use of coatings that are transparent to the naked eye (e.g., IR coatings) and allow coded markings to be placed inconspicuously on Scaffolding Compliance Analysis and/or in the line of sight on eye protection PPE (e.g., on the lens). This may allow for a larger coded marking on the PPE than would be possible otherwise. When using coatings that are transparent to the human eye, an image capture device that is properly chosen can be employed. An image capture device may not include an IR filter to allow IR radiation to reach the image sensor when an IR coating is employed to generate the coded markings, for example.

The access log 146 provides a log file used to record a variety of information regarding the results of the image recognition processing. For example, access log 146 may store an indication of who was (or was not) granted access to a work area. Such information may be used to help improve compliance with workplace safety rules, e.g., by identifying individuals demonstrating a pattern of non-compliance, or identifying trends of either false positives or false negatives.

Similarly, the compliance log 148 may comprise information related to one or more of the image recognition events. For example, records of each identified person, the relative positioning of any identified PPE on the person, the kind/type of PPE identified and/or not identified, and any other parameters associated with the image recognition system that may be useful in providing training and/or predicting additional needs for PPE.

The scaffolding compliance computer vision system 100 may also comprise an output device 108. The output device may be configured to receive data from the image recognition processing system 110 and output the information to one or more displays for viewing by a person or people. When compliance with the PPE standards is detected, the output information may include an indication that access to the work area and/or device is granted. When non-compliance is detected, the output information may include, for example, an indication as to the proper PPE required, the proper positioning of the PPE on the person, a warning concerning the effects of non-compliance, and any other information that may be useful in informing the person of the proper PPE standards. The output device 108 may be positioned proximate the other components of the system and/or the output device 108 may be in a control room to allow an operator to view the results of the image recognition process occurring at an access point and/or a piece of equipment.

The processor continuously executes the image recognition processing tool [440], which receives one or more images from an image capture device 102, detects one or more items of personal protective equipment within the one or more images, detects the positioning of the one or more items of personal protective equipment on a person within the one or more images when the one or more items of personal protective equipment are detected, and determines the type of the one or more items of personal protective equipment when the one or more items of personal protective equipment are detected.

The communication component 132 may be configured to provide communication from the image recognition system and one or more additional components of the scaffolding compliance computer vision system 100, such as the image capture device 102, the trigger device 104, the access device 106, output device 108, and/or the memory component 138 using a suitable wired and/or wireless connection (e.g., a Wi-Fi connection). Examples of components used to form the communication component 132 can include, but are not limited to, wireless access points, internet routers, network gateways, as well as other type of communication equipment, and any combinations thereof. In an embodiment, communication component 132 may connect the image recognition processing system 110 to a TCP/IP based network 150. In some embodiments, suitable wired connections between the components of the image recognition system 100 may include a USB, a Firewire or a serial connection. Further, embodiments may be implemented using an integrated device that includes the image capture device 110, trigger device 120, and components of the image recognition processing system 140. In an embodiment, any of the elements may be directly coupled rather than be coupled through a network or network elements, and one or more of the components be integrated into a single unit.

The communications component pushes any visible non-compliance of scaffolding to the Health and Safety compliance officer. The communications component can include a web-based dashboard that presented the alerts in real-time.

Various image recognition algorithms may be used in one or more portions of the image recognition process system 110 to detect one or more features of the PPE and/or a person within the images. Suitable algorithms can include, but are not limited to, the background modeling/removal method, Canny imaging, Harris corner imaging, Shen-Castan edge detection, grey level segmentation, skeletonization, etc. Any of the algorithms may be used to process image data in a manner that identifies the visual features of an item of PPE and/or a person (e.g., eyes, head, arms, hands, and/or other body parts). Using the original image, any identified features, and/or any extracted portion of the image, various classification routines can be used to determine if one or more features are present in the images. For example, vector space classifier model and/or an adaptive learning algorithm (e.g., an adaboost algorithm) may be used to identify one or more features of a person and/or an item of PPE based on various classifiers. The classification routines can be based on various properties of the image, any identified features, and/or any extracted portion such as one or more edges, lines, Haar-like features, appearance features, local binary pattern, Histogram Orientation Gradient (HOG), Gabor filtered features, etc. The resulting overall process may be configured to identify one or more features of the person and/or one or more items of PPE.

In one example, the scaffolding image analysis component 118 takes 10 frames of an incoming image sensor per second, and proceeds to detect if there is a person visible in the scaffolding site. If a person is at the site, the system will check if any scaffolding tags are visible in order to determine the ruleset applicable to that site (e.g., from scaffolding compliance information 140 and safety standards 142 stored in memory component 138). With this, the scaffolding image analysis component 118 will now have a Region of Interest (ROI) to analyze. In that ROI, the scaffolding image analysis component 118 determines the presence of appropriate PPE and executes pose detection on all visible people. Combining the output of the PPE presence, the identified scaffolding tags, and pose estimation the image analysis component 118, with scaffolding compliance analysis 124, can determine if PPE is properly used by person(s) on the scaffold. The scaffolding image analysis component 118 can estimate the height of the scaffolding and if the same is higher than a configured threshold, checks if the person seems to be wearing a proper harness and anchor.

Figure 2:
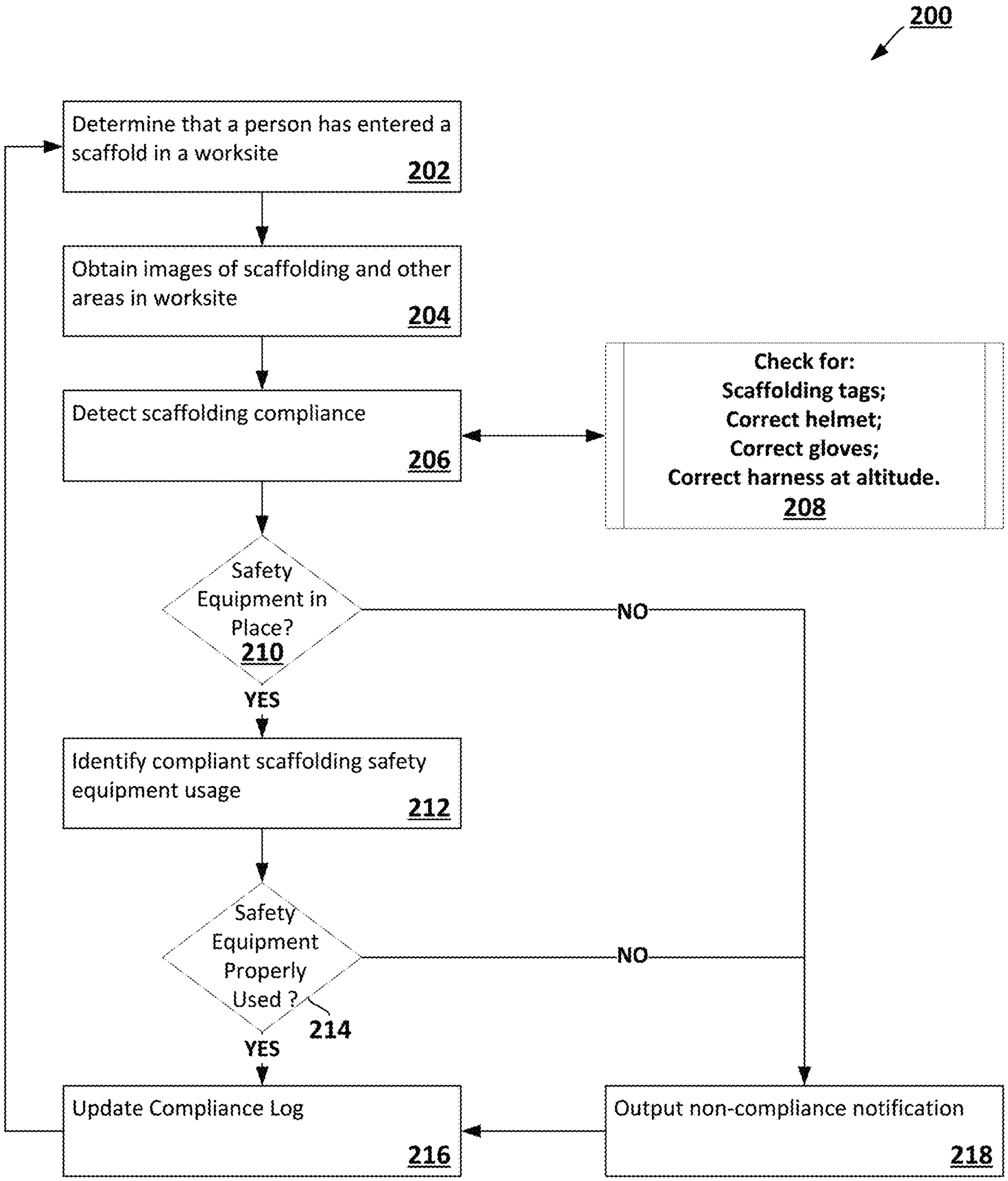
FIG. 2 is a process flow diagram illustrating an example process for determining scaffold safety compliance in accordance with embodiments of the present disclosure.

FIG. 2 is a process flow diagram illustrating an example process for determining scaffold safety compliance in accordance with embodiments of the present disclosure. The method includes receiving one or more images of a scaffolding site in response to an input, identifying one or more items of personal protective equipment in the one or more images, determining the positioning of the one or more items of personal protective equipment relative to the person in the one or more images, and verifying compliance with personal protective equipment standards based on the one or more identified items of personal protective equipment.

In step 202, from the triggering device, the scaffolding image recognition processing system can determine that a person or persons has entered a scaffold in a worksite.

Figure 4:
FIG. 4 is a schematic illustration of an example computer vision analysis of scaffold height in accordance with embodiments of the present disclosure.

In step 204, from an image capture device, obtain images of the scaffold and other areas in the worksite, including images that show the one or more persons who entered the scaffold. FIG. 4 is an example illustration 400 of a scaffold being identified from an image of a worksite. The height or altitude, X, is determined by the computer vision and image analysis algorithms, and is used to assess safety rules and compliance.

In step 206, the image analysis can determine the presence of scaffold safety standards equipment and notification. For example, the image analysis can determine the presence or absence of harnesses, helmets or hard hats, safety tags. The image analysis can also determine the structure of the scaffold, such as the height of the scaffold and various structural features.

In step 208, the scaffold safety analysis can determine, from the images processed by the image analysis, whether the safety equipment is in place. The scaffold analysis can rely on extrinsic information, such as safety standards and information about the scaffold inferred from image analysis. For example, for a scaffold with a yellow warning tag and having a height above some threshold value, certain types of harnesses should be found within the images of the scaffold. The image analysis can also determine whether the safety equipment itself is configured correctly for proper human use (e.g., through shape recognition).

In step 218, if safety equipment is not present or not compliant, the system can output a non-compliant notification, such as an audible message for the worker, a text message for the foreman or supervisor, and for the health and safety officer. The system can also record non-compliance in the compliance log (step 216).

Figure 5:
FIG. 5 is a schematic illustration of an example scaffold safety compliance image recognition and non-compliance indication in accordance with embodiments of the present disclosure.
Figure 6:
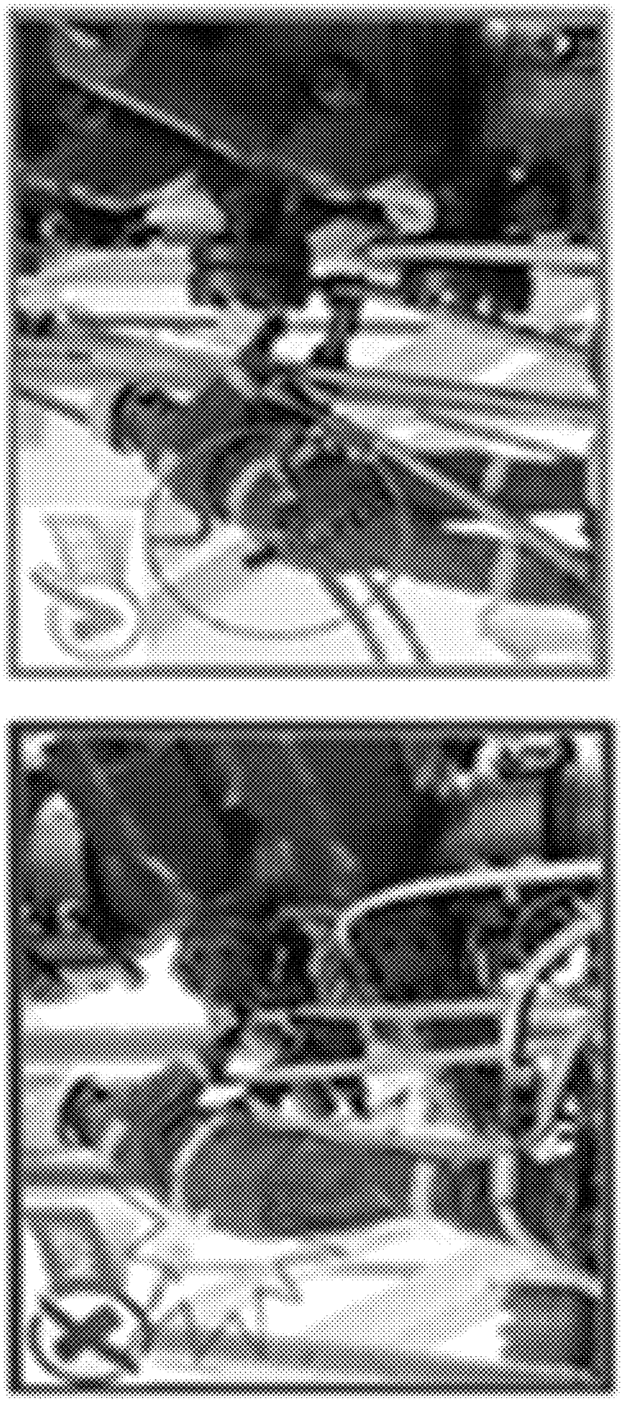
FIG. 6 is a schematic illustration of an example image recognition of non-compliant and compliant safety equipment usage in accordance with embodiments of the present disclosure.

If the safety equipment is present and compliant, in 212, the system can determine whether the safety equipment is being used properly by the worker. The system can perform further image analysis on the person or portions of person on the scaffold to check to see if the safety equipment is being used properly. For example, a helmet should be worn and not carried or slung; harnesses should be buckled correctly, etc. FIGS. 5 and 6 are schematic illustration of an example scaffold safety compliance images and non-compliance indication in accordance with embodiments of the present disclosure. In FIG. 5, an image 500 is captured showing multiple persons on the scaffold. First, the presence of persons on the scaffold triggers the image analysis routines for determining compliance with scaffold safety rules. Second, as shown in FIG. 5, a person on the scaffold does not have a helmet on. The system can identify the non-compliance and signal the non-compliance by one or more modalities.

In FIG. 6, an image is shown of a person on the scaffold with a non-compliant harness. FIG. 6 also shows the person in-compliance with harness safety rules. The image analysis can be used to identify both compliance and non-compliance.

In step 216, if a person is determined to be using safety equipment in a compliant way, then the compliance log is updated, and the system can revert to step 202. The compliance log can include a list of persons (e.g., from triggering event showing unique ID of person on scaffold, access log, etc.), as well as compliant and non-compliant events.

In some embodiments, the process can create a hierarchy of steps to ease demands for processing resources and be more efficient. For example, prior to determining compliance with safety standards, the image analysis can identify the correct standards to apply by determining the presence of a safety notification tag (e.g., green, yellow, or red tag), and identifying the corresponding safety standards or rules associated with that tag. In addition, or in the alternative, the image analysis can determine the height or other structural features of the scaffold. For example, a very tall scaffold (height above some threshold) can have a different safety standard than a short scaffold. A scaffold to support construction might have a different structural integrity requirement than a scaffold to support washing or painting, where no heavy equipment is used. Thus, by first analyzing the images for specific scaffold information, the system can quickly identify the particular ruleset or standards to apply.

FIG. 3 is an example process flow for determining scaffold safety compliance using trained algorithms in accordance with embodiments of the present disclosure. FIG. 3 illustrates the various types of processing algorithms that can support the image processing and analysis routines described herein. Table 1 below provides a summary of the processing algorithms that can be used:

TABLE 1

Processing algorithms for analysis routines.

| Process | Algorithm |
|---|---|
| Incoming video stream, captured frames | |
| Determine presence of person on scaffold | Trained Yolo Architecture |
| Determine presence of scaffold tags | Trained Yolo Architecture |
| Determine type of detected tag | Trained Resnet 50 |
| Set appropriate behavior ruleset based on the tag | If/Then Code |
| Analyze region of interest | Trained Resnet 50; Trained Resnet 3D 50 |
| Determine presence of PPE | Trained Yolo Architecture |
| Execute pose estimate | Pose Estimation |
| Determine if PPE is properly placed | Trained Resnet 3D 50 |
| Estimate height of scaffolding | If/Then Code |
| If height > x, determine PPE is on properly | Trained Resnet 50; If/Then Code |

Table 1 and FIG. 3 do not illustrate a strict order of operations. Rather, the operations are highlighted to show example processing routines that can support each type of image analysis.

Figure 7:
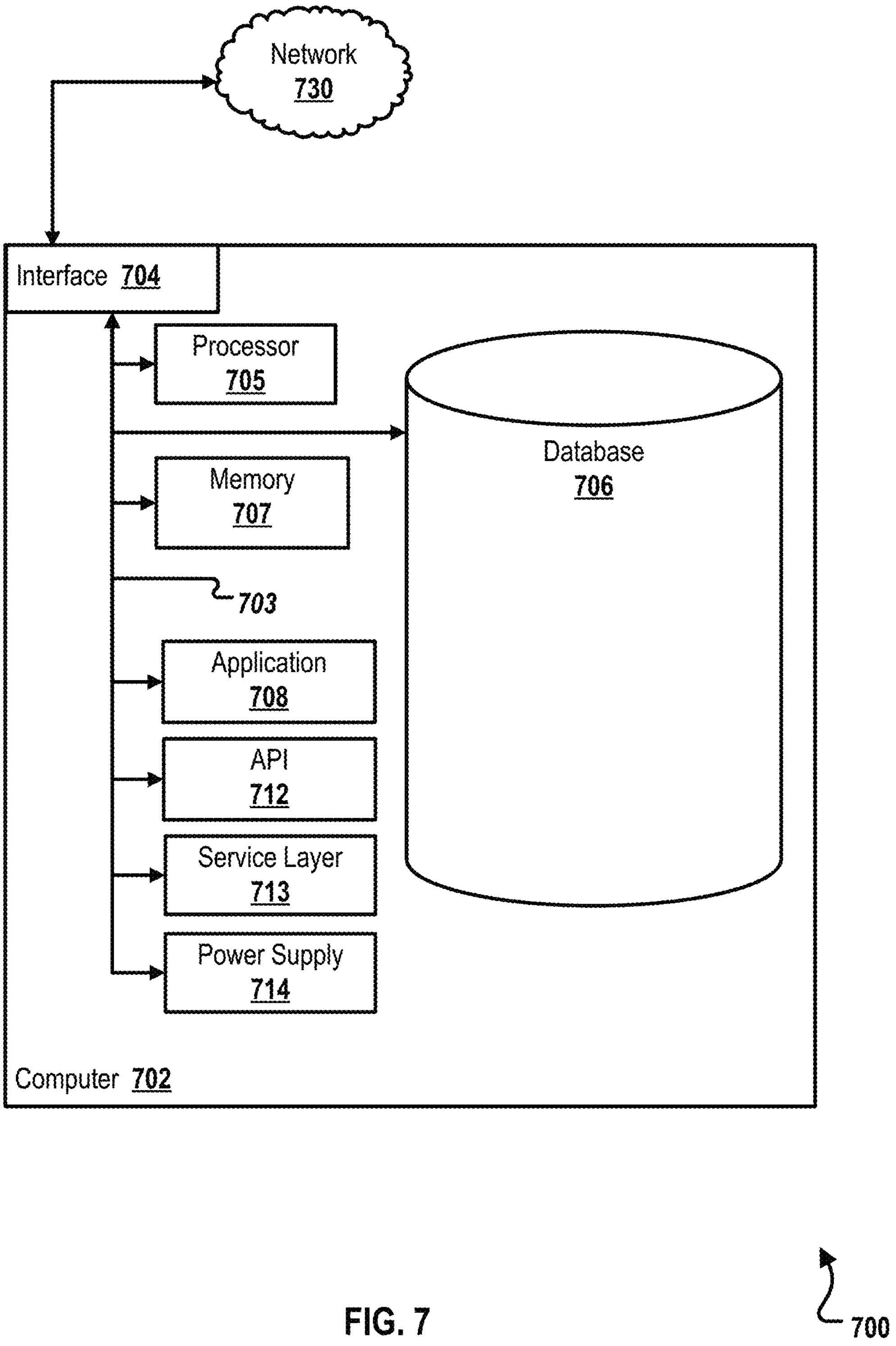
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The method includes receiving one or more images of a scaffolding site in response to an input, identifying one or more items of personal protective equipment in the one or more images, determining the positioning of the one or more items of personal protective equipment relative to the person in the one or more images, and verifying compliance with personal protective equipment standards based on the one or more identified items of personal protective equipment.

A personal protective equipment (PPE) compliance system, in one embodiment, has a memory with non-transitory computer-readable media, a processor, and an image recognition processing tool. The processor continuously executes the image recognition processing tool, which receives one or more images from an image capture device, detects one or more items of personal protective equipment within the one or more images, detects the positioning of the one or more items of personal protective equipment on a person within the one or more images when the one or more items of personal protective equipment are detected, and determines the type of the one or more items of personal protective equipment when the one or more items of personal protective equipment are detected.

The image recognition system may be used to verify compliance with Scaffolding Compliance standards for one or more types of PPE, such as glasses, goggles, earplugs, earmuffs, face masks, respirators, hairnets, hard hats, anchors, wrist bands, gloves, skirts, gowns, aprons, shoes, boots, safety harnesses, safety suits, chemical suits, and any combinations thereof, in one embodiment. Specific types of glasses, such as shatter-resistant glasses, light-filtering glasses, laser safety glasses, and so on, may be included in the category of glasses. It is also possible to divide the types into sub-groups. For any given user, a hierarchy of PPE kind, type, and sub-types can then be explored. The image recognition system described herein can be utilized to detect not only the type of PPE but also the exact kind of PPE, as well as one or more sub-types of Scaffolding Compliance Analysis in some instances. While the image recognition system's description may mention goggles as an example of PPE, it is expressly acknowledged that any other PPE types can be employed with the image recognition system described here.

An imaging sensor is used to collect one or more images that are represented by image data and/or can be converted into image data by the image capture device. An electronic device (e.g., a camera or other image capturing device) is utilized to capture an image of an individual initiating the trigger device in one embodiment. In one embodiment, suitable image capture devices include, but are not limited to, analog video cameras, digital video cameras, color and/or monochrome cameras, closed-circuit television (CCTV) cameras, charged coupled device (CCD) sensors, complementary metal-oxide-semiconductor (CMOS) sensors, analog and/or digital cameras, pan-tilt-zoom cameras (PTZ), infrared imaging devices, and any combination thereof. The circuitry, components, and connections for conveying the image to one or more additional components of the image recognition system, such as the image recognition processing system, make up the image capture device.

An image extraction component, a Scaffolding Compliance Analysis component, and a communications component are included in one embodiment of the image recognition process system. The image recognition process system may include a set of instructions for execution on a computer that includes a processor and a non-transitory computer-readable medium that serves as a memory.

To detect one or more elements of the Scaffolding Compliance Analysis and/or a person within the photos, various image recognition algorithms may be used in one or more portions of the image recognition process system. The background modeling/removal approach, Canny imaging, Harris corner imaging, Shen-Castan edge detection, grey-level segmentation, skeletonization, pose estimation, Object Localization, and Object Classification, among others, are suitable algorithms. Any of the algorithms can be used to process image data in a way that detects visual aspects of Scaffolding Compliance Analysis and/or people (e.g., eyes, head, arms, hands, and/or other body parts). Various classification techniques can be used to identify if one or more features are present in the photos using the original image, any detected features, and/or any extracted section of the image. For example, depending on multiple classifiers, a vector space classifier model and/or an adaptive learning algorithm (e.g., an AdaBoost algorithm) may be used to detect one or more features of a person and/or an item of Scaffolding Compliance Analysis. The classification algorithms might be based on picture attributes, detected features, and/or extracted portions such as one or more edges, lines, Haar-like features, Resnet 50 generated features, local binary pattern, Histogram Orientation Gradient (HOG), Gabor filtered features, Resnet 50 based features and so on. The overall procedure can then be designed to identify one or more characteristics of the individual and/or one or more pieces of Scaffolding Compliance Analysis.

The image extraction component can be set up to take image data and extract a section of it that corresponds to a person and/or one or more pieces of Scaffolding Compliance Analysis. The image extraction component may include a set of instructions for analyzing image data from the image capture device to identify a specific object or objects, such as the Scaffolding Compliance Analysis item or items, and/or one or more portions of a human, such as the person's shoulders and head, in one embodiment. Yolo-based Computer Vision architecture, for example, can be used to identify the edges of objects in a picture. A Region of Interest (ROI) is formed by a group of intersecting edges, and the shape of the ROI can be used to detect if one or more PPE items and/or scaffold safety compliance notifications are present, as well as their approximate placement on the person, indicators, etc. Information coming from a Pose Estimation Algorithm allows the system to determine the body posture of the people at the site. Face detection algorithms, for example, can detect a face or a person based on the classification of extracted data.

The communications component pushes any visible non-compliance of scaffolding to a Health and Safety compliance officer. In one iteration, the communications component included a web-based dashboard that presented the alerts in real-time.

Image storage may be included in the image extraction component, which is used to store image data during the image recognition process. The image storage may include a circular storage buffer configured to keep a buffer of images from the image capture device in one embodiment. The photos captured previous to the activation of the trigger device can be retrieved and used as background reference data in the image recognition process after the trigger device is activated. The image data may be saved in sequence in the image storage component until the end of the available memory is reached, and then storing may begin again at the beginning of the image storage component, overwriting the oldest stored image data. Different memory architectures may be used in other embodiments.

A background removal component may be included in one embodiment of the image recognition processing system. In this example, the image extraction component compares a captured image or images to a reference or background image and uses image subtraction to identify pixels that have changed between the two images. The ROI can then be used to identify a specific object or group of objects, such as the Scaffolding Compliance Analysis item or items and/or one or more pieces of a human, using the remaining image data. Below is a more detailed description of the picture analysis procedure.

A Scaffolding Compliance analysis component can be set up to analyze the image and/or an extracted piece of the image in order to determine the proper position/placement of the PPE and/or the person's use of the correct kind/type of PPE. A PPE placement component and/or a PPE identification component may be included in the Scaffolding Compliance analysis component in one embodiment. The Scaffolding Compliance analysis component can be set up to analyze image data and determine the position of any PPE equipment that is present on the person's body. For example, the PPE placement component may be set up to detect the location of any goggles on a person's head, and to determine whether the goggles are covering the person's eyes in a picture of the person's head. The lack of a PPE may be detected and signaled by the PPE placement component. The PPE identification component can be set up to evaluate image data and figure out what kind of PPE is being worn. The PPE identification component may also be designed to determine the type of PPE being worn, and in one embodiment, to identify any number of sub-types of the PPE in accordance with the hierarchy of kinds/types accessible for the specific PPE.

Descriptions of the numerous items of PPE and scaffold safety compliance notification information associated with a work location and/or piece of equipment may be included in the Scaffolding Compliance Analysis information. The descriptions could, for example, incorporate visual pixel patterns connected with the requisite PPE components (e.g., harness). The hierarchy descriptions for the work area and/or piece of equipment may comprise the kinds of Scaffolding Compliance Analysis, the types of PPE associated with each kind of Scaffolding Compliance Analysis, and optionally any number of sub-types and levels of sub-types associated with the procedure.

Scaffolding Compliance Analysis information may also include descriptions of various coded marking patterns used to identify the types and/or sub-types of PPE in addition to equipment and behavior descriptions. To identify specific types of Compliance, a variety of coded marks can be employed. The coded marks can be set up to identify the PPE and scaffold safety compliance notifications within the picture data and/or a piece of the image that has been removed. Color code patterns, color symbol patterns, an asymmetrical pattern, a two-dimensional bar code, a short code, a SEMACODE, a color light pattern, and the like are examples of suitable coded marks. The available surface area for placing the coded marking on the PPE, the type of material used to form the PPE, the resolution and expected distance from the camera to the coded marking, and the lighting conditions in the vicinity of the camera may all influence the coded marking chosen for use with a particular Scaffolding Compliance Analysis. The coded markings may be made of a variety of materials, such as coatings that absorb and/or reflect different wavelengths of light, such as infrared (IR) reflecting and/or absorptive coatings, ultraviolet (UV) reflective and/or absorptive coatings, and the like. The use of coatings that are transparent to the naked eye (e.g., IR coatings) and allow coded markings to be placed inconspicuously on PPE and/or in the line of sight on eye protection PPE (e.g., on the lens).

This may allow for a larger coded marking on the PPE than would be possible otherwise. When using coatings that are transparent to the human eye, an image capture device that is properly chosen can be employed. An image capture device may not include an IR filter to allow IR radiation to reach the image sensor when an IR coating is employed to generate the coded markings, for example.

The image analysis component takes 10 frames of an incoming camera per second and proceeds to detect if there is a person visible in the scaffolding site. If a person is at the site, the system will check if any scaffolding tags are visible in, order to determine the ruleset applicable to that site. With this, the system will now have a Region of Interest to analyze. In that region of interest, the system determines the presence of appropriate PPE presence and executes pose detection on all visible people. Combining the output of the PPE presence, the identified scaffolding tags, and pose estimation the system will now determine if PPE is properly placed. Finally, the system will estimate the height of the scaffolding and if the same is higher than a configured threshold, checks if the person seems to be wearing a proper harness and anchor.

This disclosure presents Scaffolding Compliance and will improve safety and fall protection at the workplace.

What is claimed is:

1. A computer-implemented method comprising:

receiving, by a hardware processor, one or more images of a worksite that includes a scaffold;

identifying, by the hardware processor operating a trained computer vision model, a presence of a person on the scaffold;

identifying, by the hardware processor operating one or more image analysis algorithms, scaffold compliance information, the scaffold compliance information being hierarchically formatted and comprising a scaffold safety tag on the scaffold, one or more items of personal protective equipment in the one or more images and coded marking patterns identifying a removed portion of the one or more images;

determining, by the hardware processor operating the one or more image analysis algorithms and by using the scaffold compliance information, a type of scaffold safety tag indicative of a level of protection required to comply with safety standards;

identifying, by the hardware processor using safety standards compliance information, a set of safety standards corresponding to the determined type of scaffold safety tag, wherein the set of safety standards comprise personal protective equipment standards;

determining, by the hardware processor operating the one or more image analysis algorithms, a position of the one or more items of personal protective equipment relative to a respective body posture of the person in the one or more images;

verifying, by the hardware processor, that the person is using the one or more items of personal protective equipment in compliance with the personal protective equipment standards based on the position of the identified one or more items of personal protective equipment relative to the respective body posture of the person; and in response to verifying non-compliance with the personal protective equipment standards, generating, by the hardware processor, a notification indicating the non-compliance.

2. The computer-implemented method of claim 1, further comprising:

determining, by the hardware processor operating the one or more image analysis algorithms, a height of the scaffold from the one or more images; and verifying, by the hardware processor using safety standards compliance information, that the person is using the one or more items of personal protective equipment in compliance with personal protective equipment standards based on the height of the scaffold.

3. The computer-implemented method of claim 1, wherein determining, by the hardware processor operating the one or more image analysis algorithms, a position of the one or more items of personal protective equipment relative to the person in the one or more images comprises identifying, from the one or more images, a uniquely identifying characteristic of the one or more items of personal protective equipment, the uniquely identifying characteristic comprising one or more of coded marks, color patterns, bar codes, emitted light frequency, or absorbed light frequency.

4. The computer-implemented method of claim 1, wherein the hardware processor processes, using the one or more image analysis algorithms, the one or more images in response to determining that a person is on the scaffold.

5. The computer-implemented method of claim 1, wherein the one or more images comprises one or both of a set of still images and a set of video frames.

6. A non-transitory, computer-readable storage medium storing instructions that, when executed by a hardware processor, perform operations comprising:

receiving, by a hardware processor, one or more images of a worksite that includes a scaffold;

identifying, by the hardware processor operating a trained computer vision model, a presence of a person on the scaffold;

identifying, by the hardware processor operating one or more image analysis algorithms, scaffold compliance information, the scaffold compliance information being hierarchically formatted and comprising a scaffold safety tag on the scaffold, one or more items of personal protective equipment in the one or more images and coded marking patterns identifying a removed portion of the one or more images;

determining, by the hardware processor operating the one or more image analysis algorithms and by using the scaffold compliance information, a type of scaffold safety tag indicative of a level of protection required to comply with safety standards;

identifying, by the hardware processor using safety standards compliance information, a set of safety standards corresponding to the determined type of scaffold safety tag, wherein the set of safety standards comprise personal protective equipment standards;

determining, by the hardware processor operating the one or more image analysis algorithms, a position of the one or more items of personal protective equipment relative to a respective body posture of the person in the one or more images;

verifying, by the hardware processor, that the person is using the one or more items of personal protective equipment in compliance with the personal protective equipment standards based on the position of the identified one or more items of personal protective equipment relative to the respective body posture of the person; and in response to verifying non-compliance with the personal protective equipment standards, generating, by the hardware processor, a notification indicating the non-compliance.

7. The non-transitory, computer-readable storage medium of claim 6, the operations further comprising:

determining, by the one or more image analysis algorithms, a height of the scaffold from the one or more images; and verifying, using safety standards compliance information, that the person is using the one or more items of personal protective equipment in compliance with personal protective equipment standards based on the height of the scaffold.

8. The non-transitory, computer-readable storage medium of claim 6, wherein determining, by the hardware processor operating one or more image analysis algorithms, a position of the one or more items of personal protective equipment relative to the person in the one or more images comprises identifying, from the one or more images, a uniquely identifying characteristic of the one or more items of personal protective equipment, the uniquely identifying characteristic comprising one or more of coded marks, color patterns, bar codes, emitted light frequency, or absorbed light frequency.

9. The non-transitory, computer-readable storage medium of claim 6, wherein the hardware processor processes, using the one or more image analysis algorithms, the one or more images in response to determining that a person is on the scaffold.

10. The non-transitory, computer-readable storage medium of claim 6, wherein the one or more images comprises one or both of a set of still images and a set of video frames.

11. A system comprising:

an image capture device to capture images of a worksite;

a hardware processor to execute instructions; and a non-transitory, computer-readable storage medium storing safety standards compliance information and storing instructions, that when executed by the hardware processor, perform operations comprising:

receiving, by a hardware processor, one or more images of a worksite that includes a scaffold;

identifying, by the hardware processor operating a trained computer vision model, a presence of a person on the scaffold;

identifying, by the hardware processor operating one or more image analysis algorithms, scaffold compliance information, the scaffold compliance information being hierarchically formatted and comprising a scaffold safety tag on the scaffold, one or more items of personal protective equipment in the one or more images and coded marking patterns identifying a removed portion of the one or more images;

determining, by the hardware processor operating the one or more image analysis algorithms and by using the scaffold compliance information, a type of scaffold safety tag indicative of a level of protection required to comply with safety standards;

identifying, by the hardware processor using safety standards compliance information, a set of safety standards corresponding to the determined type of scaffold safety tag, wherein the set of safety standards comprise personal protective equipment standards;

determining, by the hardware processor operating the one or more image analysis algorithms, a position of the one or more items of personal protective equipment relative to a respective body posture of the person in the one or more images;

verifying, by the hardware processor, that the person is using the one or more items of personal protective equipment in compliance with the personal protective equipment standards based on the position of the identified one or more items of personal protective equipment relative to the respective body posture of the person; and in response to verifying non-compliance with the personal protective equipment standards, generating, by the hardware processor, a notification indicating the non-compliance.

12. The system of claim 11, the operations further comprising:

determining, by the hardware processor operating the one or more image analysis algorithms, a height of the scaffold from the one or more images; and verifying, by the hardware processor using safety standards compliance information, that the person is using the one or more items of personal protective equipment in compliance with personal protective equipment standards based on the height of the scaffold.

13. The system of claim 11, wherein determining, by the hardware processor operating the one or more image analysis algorithms, a position of the one or more items of personal protective equipment relative to the person in the one or more images comprises identifying, from the one or more images, a uniquely identifying characteristic of the one or more items of personal protective equipment, the uniquely identifying characteristic comprising one or more of coded marks, color patterns, bar codes, emitted light frequency, or absorbed light frequency.

14. The system of claim 11, wherein the hardware processor processes, using the one or more image analysis algorithms, the one or more images in response to determining that a person is on the scaffold.

15. The system of claim 11, wherein the one or more images comprises one or both of a set of still images and a set of video frames.

* * * * *